US007127328B2

(12) United States Patent
Ransom

(10) Patent No.: US 7,127,328 B2
(45) Date of Patent: Oct. 24, 2006

(54) SYSTEM AND METHOD FOR FEDERATED SECURITY IN AN ENERGY MANAGEMENT SYSTEM

(75) Inventor: Douglas S. Ransom, Victoria (CA)

(73) Assignee: Power Measurement Ltd., Saanichton British Columbia (CA)

( * ) Notice: Subject to any disclaimer, the term of this patent is extended or adjusted under 35 U.S.C. 154(b) by 0 days.

(21) Appl. No.: 10/998,396

(22) Filed: Nov. 29, 2004

(65) Prior Publication Data

US 2005/0131583 A1   Jun. 16, 2005

Related U.S. Application Data

(63) Continuation-in-part of application No. 10/752,467, filed on Jan. 5, 2004, and a continuation-in-part of application No. 09/723,564, filed on Nov. 28, 2000, now Pat. No. 6,961,641, which is a continuation-in-part of application No. 08/798,723, filed on Feb. 12, 1997, now abandoned, which is a continuation-in-part of application No. 08/369,849, filed on Dec. 30, 1994, now Pat. No. 5,650,936.

(60) Provisional application No. 60/459,182, filed on Mar. 31, 2003, provisional application No. 60/459,152, filed on Mar. 31, 2003.

(51) Int. Cl.
*G05D 9/00* (2006.01)

(52) U.S. Cl. .................................... 700/286
(58) Field of Classification Search ............... 700/286, 700/291, 292, 295, 297; 713/150–154; 726/2–15, 726/26; 709/217–219
See application file for complete search history.

(56) References Cited

U.S. PATENT DOCUMENTS 4,589,075 A    5/1986 Buennagel ............... 364/492

(Continued)

FOREIGN PATENT DOCUMENTS

WO    WO 00/42731    7/2000

(Continued)

OTHER PUBLICATIONS

Dallas Semiconductor "About Maxim" information sheet, obtained Sep. 16, 2004 from http://www.maxim-iccom/company, 2 pages.

(Continued)

*Primary Examiner*—Maria N. Von Buhr
(74) *Attorney, Agent, or Firm*—Brinks Hofer Gilson & Lione

(57) ABSTRACT

A system and method are disclosed for providing authentication of data source and integrity between applications and users in different Non Affiliated Entities/organizations while limiting access to resources between private networks of energy management devices. A Non Affiliated Entity ("NAE") is an organization, individual or group of entities that may share some information with each other but are not closely tied, such as a group of competitor utilities. In conducting their operations, two or more applications or organizations (NAEs) may not fully trust one another, but wish to share some EM data and resources. These NAEs identify users, such as EM devices, using a "federated security" scheme that may be based on Kerberos, which allows users from one NAE to be identified to another NAE. Web service security can be combined with federated security based authentication and access control to provide for secure exchange of EM data between users of different NABs. Federation is a technology and business agreement whereby users (including non-human users such as EM devices and EM software) that are part of a single or separate organization are able to interact through a system of authentication that allows for distributed processing, data sharing and resource sharing.

49 Claims, 3 Drawing Sheets

U.S. PATENT DOCUMENTS

| | | | |
|---|---|---|---|
| 4,641,248 A | 2/1987 | Suzuki et al. | 364/492 |
| 5,181,026 A | 1/1993 | Granville | |
| 5,448,229 A | 9/1995 | Lee, Jr. | 340/870.02 |
| 5,459,459 A | 10/1995 | Lee, Jr. | 340/870.02 |
| 5,477,216 A | 12/1995 | Lee, Jr. et al. | 340/870.02 |
| 5,495,239 A | 2/1996 | Ouellette | 340/870.02 |
| 5,517,423 A | 5/1996 | Pomatto | 364/492 |
| 5,572,438 A | 11/1996 | Ehlers et al. | 364/492 |
| 5,576,700 A | 11/1996 | Davis et al. | 340/825.16 |
| 5,680,324 A | 10/1997 | Schweitzer, III et al. | 364/514 |
| 5,699,276 A | 12/1997 | Roos | 364/514 |
| 5,736,847 A | 4/1998 | Van Doorn et al. | 324/142 |
| 5,764,155 A | 6/1998 | Kertesz et al. | 340/825.08 |
| 5,862,391 A | 1/1999 | Salas et al. | 395/750.01 |
| 5,897,607 A | 4/1999 | Jenney et al. | 702/62 |
| 5,956,220 A | 9/1999 | Novosel et al. | |
| 6,005,759 A | 12/1999 | Hart et al. | 361/66 |
| 6,035,285 A | 3/2000 | Schlect et al. | 705/30 |
| 6,061,451 A | 5/2000 | Muratani et al. | 380/201 |
| 6,088,659 A | 7/2000 | Kelley et al. | 702/62 |
| 6,118,269 A | 9/2000 | Davis | 324/110 |
| 6,167,389 A | 12/2000 | Davis et al. | 705/412 |
| 6,169,979 B1 | 1/2001 | Johnson | 705/412 |
| 6,178,362 B1 | 1/2001 | Woolard et al. | 700/295 |
| 6,259,972 B1 | 7/2001 | Sumic et al. | 700/286 |
| 6,285,917 B1 | 9/2001 | Sekiguchi et al. | |
| 6,313,752 B1 | 11/2001 | Corrigan et al. | 340/657 |
| 6,327,541 B1 | 12/2001 | Pitchford et al. | 702/62 |
| 6,535,797 B1 | 3/2003 | Bowles et al. | 700/286 |
| 6,549,880 B1 | 4/2003 | Willoughby et al. | 703/13 |
| 6,553,418 B1 | 4/2003 | Collins et al. | 709/224 |
| 6,694,270 B1 | 2/2004 | Hart | |
| 6,751,562 B1 * | 6/2004 | Blackett et al. | 702/61 |
| 6,836,737 B1 * | 12/2004 | Petite et al. | 702/62 |
| 6,891,838 B1 * | 5/2005 | Petite et al. | 370/401 |
| 2001/0010032 A1 | 7/2001 | Ehlers et al. | 702/62 |
| 2001/0039537 A1 | 11/2001 | Carpenter et al. | 705/400 |
| 2002/0077729 A1 | 6/2002 | Anderson | 700/291 |
| 2002/0091784 A1 | 7/2002 | Baker et al. | 709/208 |
| 2002/0116550 A1 | 8/2002 | Hansen | 709/330 |
| 2002/0120685 A1 | 8/2002 | Srivastava et al. | 709/203 |
| 2002/0161536 A1 | 10/2002 | Suh et al. | 702/62 |
| 2003/0081790 A1 | 5/2003 | Kallahalla et al. | 380/281 |
| 2003/0110302 A1 | 6/2003 | Hodges et al. | 709/249 |
| 2003/0176952 A1 | 9/2003 | Collins et al. | 700/286 |
| 2004/0002878 A1 * | 1/2004 | Maria Hinton | 705/7 |
| 2004/0003287 A1 * | 1/2004 | Zissimopoulos et al. | 713/163 |
| 2004/0128383 A1 * | 7/2004 | Hinton | 709/225 |
| 2004/0128546 A1 * | 7/2004 | Blakley et al. | 713/201 |
| 2004/0143652 A1 * | 7/2004 | Grannan et al. | 709/223 |
| 2004/0225878 A1 * | 11/2004 | Costa-Requena et al. | 713/150 |
| 2005/0114701 A1 * | 5/2005 | Atkins et al. | 713/201 |
| 2005/0137981 A1 * | 6/2005 | Maes | 705/44 |
| 2005/0144452 A1 * | 6/2005 | Lynch et al. | 713/170 |
| 2005/0188212 A1 * | 8/2005 | Laferriere et al. | 713/185 |

FOREIGN PATENT DOCUMENTS

| | | |
|---|---|---|
| WO | WO 01/33801 A2 | 5/2001 |
| WO | WO 03/107153 A2 | 12/2003 |
| WO | WO 03/107296 A2 | 12/2003 |
| WO | WO 03/107585 A1 | 12/2003 |

OTHER PUBLICATIONS

Dallas Semiconductor "DS2432™ 1κ-Bit Protected 1-Wire EEPROM with SHA-1 Engine", product specifications, pp. 1-30, no date.

Questra Applications Summary Data Sheet, pp. 1-2, Jul. 2, 2002.

Tridium™ Vykon™ Energy "JACE-401™" Product Data Sheet, pp. 1-2, Sep. 16, 2002.

Tridium™ Vykon™ Energy "Vykon Energy Profiler" Product Data Sheet, pp. 1-4, Oct. 16, 2001.

Schneider Electric Square D "Web-Enabled Power Management Solutions" brochure, pp. 1-8, Jan. 2002.

Tridium™ Vykon™ Building "Vykon™ Alarm Service" Product Data Sheet, pp. 1-2, Jun. 20, 2002.

Tridium™ Vykon™ Building "JACE-512™" Product Data Sheet, pp. 1-2, May 15, 2002.

Tridium™ Vykon™ Building "JACE-511™" Product Data Sheet, pp. 1-2, May 28, 2002.

Vykon™ By Tridium "JACE-NP-1®" Product Data Sheet, pp. 1-2, May 28, 2002.

Vykon™ By Tridium "Workplace Pro™" Product Data Sheet, pp. 1-2, Jan. 12, 2001.

Vykon™ Building "Web Supervisor™" Product Data Sheet, pp. 1-2, Nov. 30, 2001.

A8800-1 AcquiSuite Data Acquisition System specification, pp. 1-2, Sep. 24, 2001.

LiveData® Real-Time Data Management For Energy and Utility Companies brochure, pp. 1-4, © copyright 2002, Rev. Jan. 2002.

Tridium™ Vykon™ Energy Energy "With the Right Tools Energy Costs are Controllable . . . " brochure, pp. 1-8, Nov. 1, 2001.

EnergyView™ "Energy Aggregation & Information System (EAIS) for Monitoring and Analysis of Electric and Gas Demand", selected pages from an energyView website http://66.64.38.69/energyview, pp. 1-4, Oct. 30, 2001.

Power Monitoring home page, obtained from http://www.parijat.com/Power_Monitoring.htm, Oct. 9, 2002, one page.

Press Release Aug. 24, 2000 "Connect One Announces Industry's First Wireless Chip to Connect Mobile Devices to the Internet", pp. 1-2.

Press Release, "Connect One and NAMS Create the World's First Dial-up Energy meter that Sends and Receives E-Mail Without a Gateway", Sep. 5, 2000, pp. 1-2.

NAMS Metals by Nisko, NMM-AKB Specifications p. 1 or 1, Sep. 5, 2000.

Connect One "Automatic Meter Reading via the Internet", pp. 1-2, Jul. 11, 2001.

IModem™ "The Fastest Way to Internet-Enable any Device", pp. 1-3, Jul. 11, 2001.

ConnectOne™ Connecting your Device to the Internet™ iChip™ The Internet in your palm™, pp. 1-6. Jul. 11, 2001.

Engage Networks Launches Energy Management Venture, obtained at internet address http://www.engagement.com/content/business_journal.shtml, Sep. 20, 2000. Appeared in Business Journal Feb. 11, 2000.

Engage Networks Inc. "D-Gen" Distributed Generation Management brochure, pp. 1-4. Link present as of Dec. 2, 1998 according to web archive at http://web.archive.org/web/19981205200934/www.engagenet.com/products.htm.

Engage Networks Inc. "Internet Protocol Card for Revenue Meters" brochure, pp. 1-2. Link present as of Mar. 3, 2000 on http://web.archive.org/web/20010306005433/www.engagenet.com/content/products.shtml. Original document archived at http://web.archive.org/web/20030520161648/http://www.engagenet.com/datasheets/ipcard.pdf on May 20, 2003.

Engage Networks Inc. "AEM" (Active Energy Management) brochure, pp. 1-2. Link present as of Mar. 3, 2000 on http://web.archive.org/web/20010306005433/www.engagenet.com/content/products.shtml. Original document archived at http://web.archive.org/web/20030520161850/http://www.engagenet.com/datasheets/aem.pdf.

David W. Giles, "Direct-Access Metering Via the Web", 1998 CEA Conference, Toronto, Canada, pp. 1-19 ® 1998 Poer Measurement Ltd. Conference Apr. 27-29, 1998. Presented Apr. 29, 1998.

GE Industrial Systems "EnerVista.com" brochure. Sep. 2000.

Press release, Santa Clara, CA Sep. 25, 2000 "Connect One Reduces Time, Cost and Complexity to Connect Internet Appliances to Ethernet Lans", obtained at internet address http://www.connectone.com/html/prtsep25_2000.htm.

Year 2000 Rediness Disclosure Arcom Control Systems, "Apex", obtained at internet address http://www.arcomcontrols.com/products/pcp/pcp10.htm. Document archived at http://web.archive.org/web/20000530063150/www.arcomcontrols.com/products/pcp/pcp10.htm on May 30, 2000.

Dranetz BMI, Signature System™ "Information, Knowledge, Power" brochure. Applicants believe this reference was published prior to Jan. 9, 2003.

Signature System™ Basics, obtained at internet address http://www.signaturesystem.com/sigbasics.html, Mar. 26, 2001. pp. 1-2.

Signature System™ InfoNodes, obtained at internet address http://www.signaturesystem.com/infonode.html, Mar. 26, 2001. pp. 1-2.

Questra A2B.Platform™ brochure, "Enabling conversation through universal connectivity", pp. 1-4, located at http://www.questra.com/h1_products/Questra_A2Bplatform. Applicants believe this reference was published prior to Jan. 9, 2003.

Questra A2B.Sales™ brochure, "Conversation to help you win", pp. 1-2, located at http://www.questra.com/h1_products/Questra_A2BSales. Applicants believe this reference was published prior to Jan. 9, 2003.

Power Point Presentation: Presented at "Metering Europe 2000," Sep. 5-7, 2000, source http://www.energyict.com/fh/media/Presentation_Metering2000Munchens5.zip, pp. 1-37.

Brochure, RTU+Server, source http://www.energyict.com/fh/media/tru_plus_server.pdf, pp. 1-3, Apr. 6, 2001. Document archived at http://web.archive.org/web/20020702060538/http://www.energyict.com/fh/media/rtu_plus_server.pdf Feb. 7, 2001. Link present on http://web.archive.org/web/20010207201520/www.energyict.com/fa/en_ab_frame.htm on or before Feb. 7, 2001.

Brochure, EiServer, The Energy Information server, source http://www.energyict.com/fh/media/EiServer.pdf, pp. 1-7, Jul. 14, 2000. Link present on or before Feb. 7, 2001.

Advertisement, EiServer and RTU+Server, source, metering International—2001 Issue 1, p. 19, publish date 1st Quarter 2001, p. 1.

Article, "Providing Tomorrow's Energy Management and Metering Tools Today," source, Metering International—2001 Issue 1, p. 18, publish date 1st Quarter 2001, p. 1.

"Email relating to the general technology of the application received from a competitor", from Erich W. Gunther [mailto:erich@electrotek.com] to Brad_Forth@pml.com sent May 9, 2001 3:36pm, pp. 1-2.

Electro Industries Press Release "Nexus 1250 High-Performance Power Monitor Gains Ethernet TCP/IP Capabilities," obtained at internet address http://www.electroindustries.com/feb5.htmi. Feb. 5, 2001 pp. 1-2.

Electro Industries "Nexus 1250 for industry and Utilities," brochure, obtained at internet address http://www.electroindustries.com/pdf/nxsbrochure.pdf pp. 1-14 printed Jun. 1, 2001.

NetSilicon Solutions on Chip "NET+ARM™ Ethernet Processors" brochure, obtained at internet address http://www.netsilicon.com/EmbWeb/products/netarm.asp, pp. 1-2, Copyright © 2001 NetSilicon, Inc. Document archived http://web.archive.org/web/20010719171514/www.netsilicon.com/embweb/products/netarm.asp on Jul. 19, 2001.

EmWare® "Solutions Device Link," brochure, obtained at internet address http://www.emware.com/solutions/devicelink/, pp. 1-3, printed Jun. 1, 2001. Document archived http://web.archive.org/web/20010524222001/www.emware.com/solutions/devicelink/ May 24, 2001.

IReady® "Technology iReady's Hardwired TCP/IP Stack," homepage, obtained at internet address http://www.iready.com/, p. 1, © 2000-2001 iReady corporation, printed Jun. 1, 2001. First publishes as early as mar. 1, 2001. http://web.archive.org/web/20010515202409/http://www.iready.com/ link on right side to "technology/index.html" captured Mar. 15, 2001.

MuNet News & Events Press Releases "muNet makes cable industry debut with its WebGate™ Internet Residential and Commercial Information Systems, and HomeHeartBeat", http://www.munet.com, pp. 1-2, Dec. 15, 1999.

MuNet News & Events Press Releases "muNet's WebGate™ Systems Finds a Home on the Internet!" http://www.munet.com, pp. 1-2, Mar. 18, 1999.

WebGate™ IRIS Technology, products brochure pp. 1-9. Applicants believe this reference was published prior to Jan. 9, 2003.

MuNet News & Events Press Release "muNet Demonstrates End-to-Enc IP-Based Energy Management System at DistribuTECH," Feb. 5, 2000, pp. 1-2.

WebGate™ IRIS™ "Internet Residential Information System," p. 1 pof 1 Published in Energy IT Nov./Dec. 2000 Technology Info Center. See http://www.platts.com/infotech/issues/0011/eittic0011.shtml for this reference— search for munet.com.

WebGate™ ICIS™ "Internet Commercial Information System," p. 1 of 1 Published in Energy IT Nov./Dec. 2000 Technology Info Center. See http://www.platts.com/infotech/issues/0011/eittic0011.shtml for this reference—search for munet.com.

F. Momal, C. Pinto-Pereira, "Using World-Wide-Web for Control Systems" Abstract, AT Division CERN, 1211 Geneva 23, 6 pages. Published 1995.

P. M. Corcoran, J. Desbonnet and K. Lusted "THPM 14.2 CEBus Network Access via the World-Wide-Web" Abstract, © 1996 IEEE, pp. 236 & 237.

ATI Systems, "Technical Overview Ethernet SCAN II™ Module" specification, Oct. 1994, 2 pages.

J. Hofman. "The Consumer Electronic Bus: An Integrated Multi-Media LAN for the Home", International Journal of Digital and Analog Communication Systems, vol. 4, 77-86 (1991), © 1991 by John Wiley & S ons, Ltd.

Lucent Technologies AT&T Forms Expert Team to Design Utility Industry Solutions, press release, Monday, Jan. 23, 1995, pp. 1&2.

Newsbytes Inc., Tampa, FLA, Apr. 13, 1995 pNEW04130013 "TECO & IBM—The "Smart House" Is Here" Press release, obtained at http://filebox.vt.edu/users/mikemikemike/smart-house/infotrac/article4.txt, Jul. 11, 2002, pp. 1&2.

Distributed.Net, http://n0cgi.distributed.net/faq/cache/178.html, printed Jun. 10, 2003. Link archived at http://web.archive.org/web/20000901052607/n0cgi.distributed.net/faq/cache/178.html on Sep. 1, 2000.

Questra, Security overview, obtained http://www.questra.com/products/security.asp, printed Jun. 10, 2003. 2 pages. Applicants believe this reference was published prior to Jan. 9, 2003.

Questra Mastering Smart Security brochure, 2 pages Copyright 2002 Questra Corporation, obtained http://www.questra.com/collateral/collateral_files/SecurityOverview.pdf, printed Jun. 10, 2003. Applicants believe this reference was published prior to Jan. 9, 2003.

Questra Total Access brochure, 2 pages, Copyright 2003 Questra Corporation, obtained http://www.questra.com/collateral/collateral_files/TotalAccess.pdf, printed Jun. 10, 2003. Applicants believe this reference was published prior to Jan. 9, 2003.

Axedra DRM System Overview, 2 pages, obtained http://www.axeda.com/solutions/overviw.html, printed Jun. 9, 2003. Applicants believe this reference was published prior to Jan. 9, 2003.

Axeda Access, 3 pages, obtained http://www.axeda.com/solutions/portals/portal_access.html, printed Jun. 9, 2003. Applicants believe this reference was published prior to Jan. 9, 2003.

Axeda DRM Technology Overview, 1 page, obtained http://www.axeda.com/solutions/tech_challenges/firewallfriendlyt.html, printed Jun. 9, 2003. Applicants believe this reference was published prior to Jan. 9, 2003.

Axeda DRM Technology Overview, 1 page, obtained http://www.axeda.com/solutions/tech_challenges/index.html, printed Jun. 9, 2003. Applicants believe this reference was published prior to Jan. 9, 2003.

Axeda DRM Technology Overview, 1 page, obtained http://www.axeda.com/solutions/tech_challenges/standards.html, printed Jun. 9, 2003. Applicants believe this reference was published prior to Jan. 9, 2003.

Axeda Solutions for Industry, 1 page, obtained http://www.axeda.com/solutions/industries/industrial.html, printed Jun. 9, 2003. Archived at http://web.archive.org/web/20020221165904/http://axeda.com/industries/industrial.html on Feb. 21, 2002.

Axeda Agents, 2 pages, obtained http://www.axeda.com/solutions/device_servers/index.html. printed Jun. 9, 2003. Applicants believe this reference was prublished prior to Jan. 9, 2003.

Axeda Case Studies, "Axeda Prevents Power Failures at a Leading Microprocessor Plant in Israel", 2 pages, obtained http://www.axeda.com/industies/casestudies_microprocessor.html, printed Jun. 9, 2003. Applicants believe this reference was published prior to Jan. 9, 2003.

David Mueller and Sandy Smith, Electrotek Concepts, "Using Web-based Power Quality Monitoring for Problem Solving and Improving Customer Relations", proceedings of the 4th Annual Latin American Power 99 Conference, Jun. 29, 1999, pp. 263-271.

Rolf Carlson, Sandia National Laboratories, *Sandia SCADA Program High-Security SCADA LDRD Final Report*, Apr. 2002.

* cited by examiner

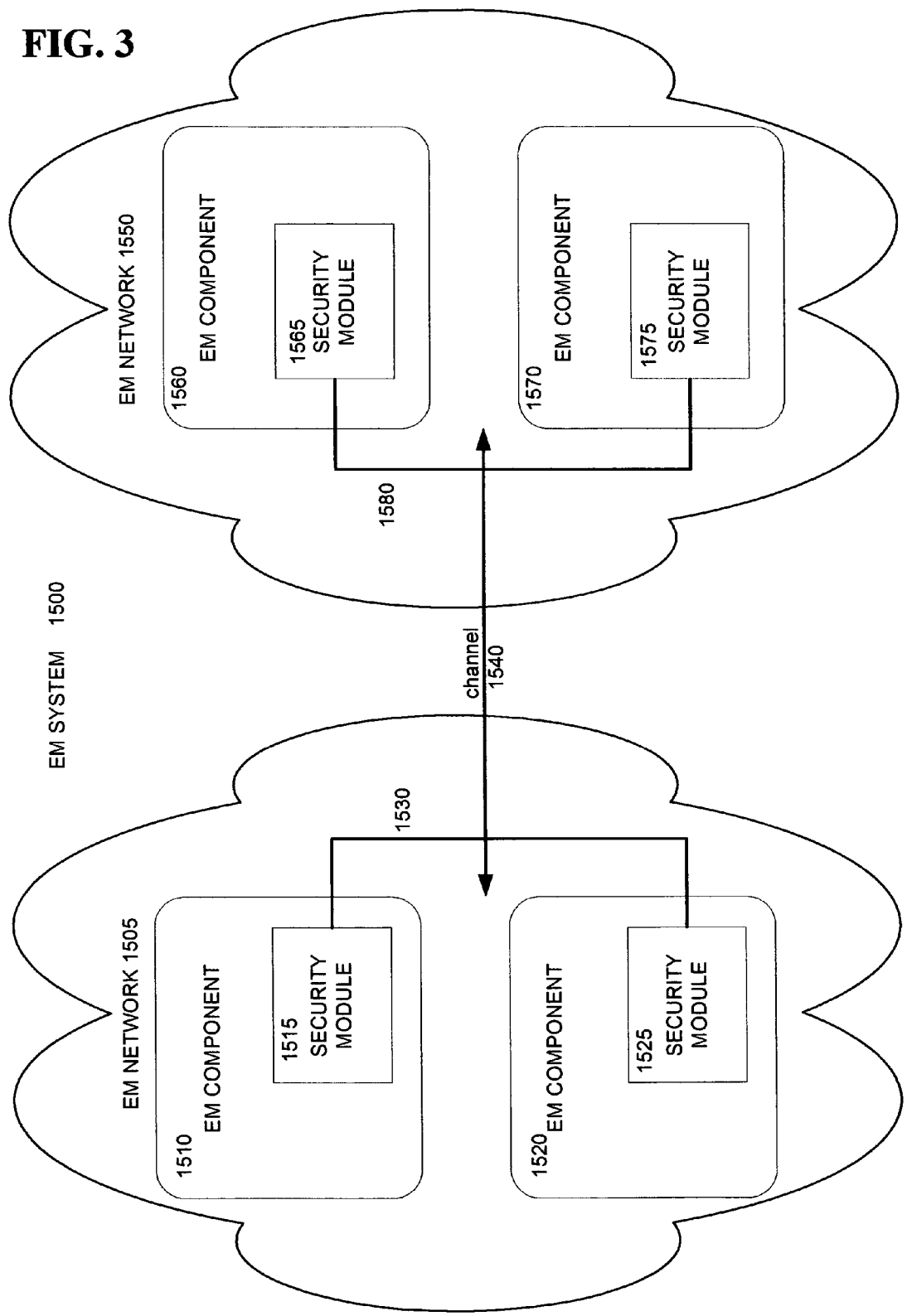

US 7,127,328 B2

SYSTEM AND METHOD FOR FEDERATED SECURITY IN AN ENERGY MANAGEMENT SYSTEM

REFERENCE TO RELATED APPLICATIONS

This application is a continuation-in-part under 37 C.F.R. § 1.53(b) of U.S. patent application Ser. No. 10/752,467, filed Jan. 5, 2004, the entire disclosure of which is hereby incorporated by reference.

U.S. patent application Ser. No. 10/752,467 claims the benefit of the filing date under 35 U.S.C. § 119(e) of U.S. Provisional Application Ser. No. 60/459,182 filed Mar. 31, 2003, which was incorporated by reference, and U.S. Provisional Application Ser. No. 60/459,152 filed Mar. 31, 2003, which was incorporated by reference.

U.S. patent application Ser. No. 10/752,467 is also a continuation-in-part under 37 C.F.R. § 1.53(b) of U.S. patent application Ser. No. 09/723,564 filed Nov. 28, 2000 now U.S. Pat. No. 6,961,641, the entire disclosure of which was incorporated by reference. U.S. patent application Ser. No. 09/723,564 is a continuation-in-part under 37 C.F.R. § 1.53(b) of U.S. patent application Ser. No. 08/798,723 filed Feb. 12, 1997, abandoned, the entire disclosure of which was incorporated by reference, which is a continuation-in-part under 37 C.F.R. § 1.53(b) of U.S. patent application Ser. No. 08/369,849 filed Dec. 30, 1994 now U.S. Pat. No. 5,650,936, the entire disclosure of which was incorporated by reference.

BACKGROUND

With the advent of high technology needs and market deregulation, today's energy market has become very dynamic. High technology industries have increased their demands on the electrical power supplier, requiring more power, increased reliability and lower costs. A typical computer data center may use 100 to 300 watts of energy per square foot compared to an average of 15 watts per square foot for a typical commercial building. Further, an electrical outage, whether it is a complete loss of power or simply a drop in the delivered voltage, can cost these companies millions of dollars in down time and lost business.

In addition, deregulation of the energy industry is allowing both industrial and individual consumers the unprecedented capability to choose their supplier which is fostering a competitive supply/demand driven market in what was once a traditionally monopolistic industry.

The requirements of increased demand and higher reliability are burdening an already overtaxed distribution network and forcing utilities to invest in infrastructure improvements at a time when the deregulated competitive market is forcing them to cut costs and lower prices. Accordingly, there is a need for a system of managing the distribution and consumption of electrical power which meets the increased demands of users and allows the utility supplier to compete in a deregulated competitive marketplace.

BRIEF DESCRIPTION OF THE DRAWINGS

FIG. 3 depicts an EM System according to another embodiment.

DETAILED DESCRIPTION OF THE DRAWINGS AND PRESENTLY PREFERRED EMBODIMENTS

Figure 1:
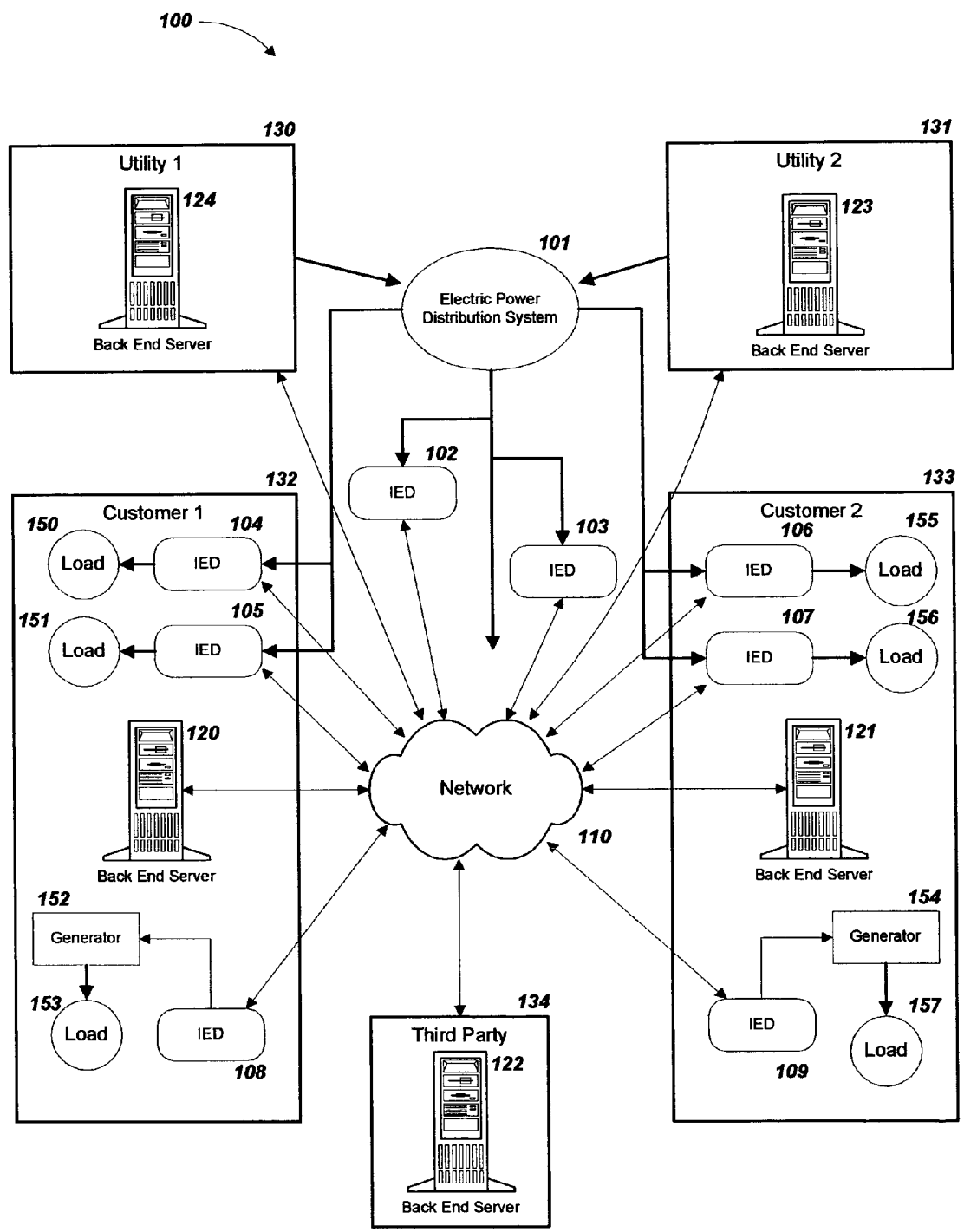
FIG. 1 illustrates a first embodiment of a Power Management Architecture.

FIG. 1 illustrates an overview of one embodiment of a Power Management Architecture ("architecture") 100, which contains one or more IED's 102, 103, 104, 105, 106, 107, 108, 109. A more detailed description of this architecture may be found in U.S. patent application Ser. No. 10/752,467, herein incorporated by reference. The IED's 102–109 are connected to an electrical power distribution system 101, or portion thereof, to measure, monitor and control quality, distribution and consumption of electric power from the system 101, or portion thereof. The power distribution system is typically owned by either a utility/supplier or consumer of electric power however some components may be owned and/or leased from third parties. The IED's 102–109 are further interconnected with each other and back end servers 121, 122, 123, 124 via a network 110 to implement a Power Management Application ("application") 111 (not shown). In the preferred embodiment, the network 110 is the Internet. Alternatively, the network 110 can be a private or public intranet, an extranet or combinations thereof, or any network utilizing the Transport Control Protocol/Internet Protocol ("TCP/IP") network protocol suite to enable communications, including IP tunneling protocols such as those which allow virtual private networks coupling multiple intranets or extranets together via the Internet. The network 110 may also include portions or sub-networks which use wireless technology to enable communications, such as RF, cellular or Bluetooth technologies. The network 110 preferably supports application protocols such as telnet, FTP, POP3, SMTP, NNTP, Mime, HTTP, SMTP, SNNP, IMAP, proprietary protocols or other network application protocols as are known in the art as well as transport protocols SLIP, PPP, TCP/IP and other transport protocols known in the art.

The Power Management Application 111 utilizes the architecture 100 and comprises power management application components which implement the particular power management functions required by the application 111. The power management application components are located on the IED 102–109 or on the back end server 121–124, or combinations thereof, and can be a client component, a server component or a peer component. Application components communicate with one another over the architecture 100 to implement the power management application 111.

The above described architecture provides a generally accessible connectionless/scalable communications architecture for operating power management applications. The architecture facilitates IED-supplier communications applications such as for automated meter reading, revenue collection, IED tampering and fraud detection, power quality monitoring, load or generation control, tariff updating or power reliability monitoring. The architecture also supports IED-consumer applications such as usage/cost monitoring, IED tampering and fraud detection, power quality monitoring, power reliability monitoring or control applications such as load shedding/cost control or generation control. In addition, real time deregulated utility/supplier switching applications which respond in real time to energy costs fluctuations can be implemented which automatically switch suppliers based on real time cost. Further the architecture supports communications between IED's such as early warning systems which warn downstream IED's of impending power quality events. The architecture also supports utility/supplier to customer applications such as real time pricing reporting, billing reporting, power quality or power reliability reporting. Customer to customer applications may also be supported wherein customers can share power quality or power reliability data.

As described above, alternative embodiments are contemplated herein which relate to Energy Management ("EM") Components that employ various techniques and use various services to enable them to communicate in a secure, safe fashion with one another. These disclosed embodiments relate to EM Networks and EM Systems that employ various means to manage security within the network and the system, as were described above.

Energy Management ("EM") data includes, but is not limited to, Electrical Operation Data such as volts, amps, status, power; Power Quality Data such as harmonics, power factor, reliability (such as number of nines), disturbance data; Consumption Data such as energy and demand; Event Data such as set point actions, status changes and error messages; Financial Data such as energy cost, power factor penalties, revenue data; billing data such as tariffs for gas, water, steam and air; Environmental Data such as temperature, pressure, humidity, pollution, and lightning/atmospheric disturbance data; Water Air Gas Electric Steam ("WAGES") data; Configuration data such as frameworks, firmware, software, calculations involving EM Data and commands; and aggregated data, where at least one energy management datum is combined with other data points. For the purposes of this application, combined data includes measured data, aggregated data and/or computed data.

EM component is an entity that creates, consumes or routes EM data. These components include but are not limited to: Intelligent Electronic Devices ("IEDs") (also known as EM Devices), analog sensors, digital sensors as described in U.S. Pat. No. 6,236,949, gateways, and computers.

As was described above, IEDs include revenue electric watt-hour meters, protection relays, programmable logic controllers, remote terminal units ("RTUs"), fault recorders, other devices used to monitor and/or control electrical power distribution and consumption, RTUs that measure water data, RTUs that measure air data, RTUs that measure gas data, and RTUs that measure steam data. IEDs are widely available that make use of memory and microprocessors to provide increased versatility and additional functionality. Such functionality includes the ability to communicate with other hosts and remote computing systems through some form of communication channel. IEDs also include legacy mechanical or electromechanical devices that have been retrofitted with appropriate hardware and/or software allowing integration with the power management system. Typically an IED is associated with a particular load or set of loads that are drawing electrical power from the power distribution system. The IED may also be capable of receiving data from or controlling its associated load. Depending on the type of IED and the type of load it may be associated with, the IED implements a function that is able to respond to a command and/or generate data. Functions include measuring power consumption, controlling power distribution such as a relay function, monitoring power quality, measuring power parameters such as phasor components, voltage or current, controlling power generation facilities, computing revenue, controlling electrical power flow and load shedding, or combinations thereof. For functions that produce data or other results, the IED can push the data onto the network to another IED or back end server/database, automatically or event driven, or the IED can send data in response to an unsolicited request. IEDs capable of running Internet protocols may be known as "web meters". For example, a web meter may contain a web server.

For the purposes of the disclosed embodiments, a computer is defined as a device that comprises a processing unit and includes, but is not limited to, personal computers, terminals, network appliances, Personal Digital Assistants ("PDAs"), wired and wireless devices, tablet personal computers, mainframes, as well as combinations thereof.

A framework is a set of interconnected functions that are uploadable to a device and that affect the behavior of the device. A framework can be produced from scripting languages like PERL, VBScript and XSLT, predicate logic like Prolog, fuzzy logic and functional programming, spreadsheets like Visicalc and Excel, user interface definitions such as XSLT and XFORMS, and downloadable software that is interpreted, just-in-time compiled or compiled. Alternately, frameworks may be created and manipulated by connecting multiple integrated object network ("ION®") modules together. ION® defines the way information specifically power monitoring information, is accessed, transferred and manipulated inside an EM Device. The functionality and data manipulation of the EM Device can be accomplished by one or several frameworks stored in the IED software. A complete list of ION® modules is contained in the "ION® Reference Manual", printed by Power Measurement Ltd., located in Saanichton, B.C., Canada.

One or more EM components are coupled together in any configuration to form EM networks. As discussed above, herein, the phrase "coupled with" is defined to mean directly connected to or indirectly connected through one or more intermediate components. Such intermediate components may include both hardware and software based components.

EM systems are formed from coupling one or more EM Networks. When there is more than one EM network within the system, the networks can be linked in any functional way. Not all networks within a system are directly coupled with one another, and EM networks may be coupled with one another via a third EM network. Non-EM networks may also couple EM networks with one another.

These EM networks or EM systems may represent many entities, including Device Manufacturers, Utilities, Power Consumers, End Users, National Accounts Customers, Load Serving Entities ("LSEs"), Application Service Providers ("ASPs"), Independent Service Operators ("ISOs"), Non Affiliated Entities ("NAEs"), customer sites running device configuration utilities, Meter Shops, and Third Party Data Sources providing energy related data such as weather, tariffs and so forth.

LSEs are entities authorized to supply energy to retail customers.

ASPs are typically entities that supply software application and/or software related services over the Internet.

ISOs are entities that were formed to dole out electricity to the grid after deregulation NAEs are groups of entities that may share some information with each other but are not closely tied. For example, utilities, energy marketers, ISOs and other entities all need to exchange EM data with one another as part of their business, but don't necessarily trust each other or share the same private network.

An exemplary device configuration utility is ION® Designer, manufactured by Power Measurement Ltd, of Saanichton, B.C. Canada.

Meter Shops are plants or industrial units where IEDs are configured.

Some EM components may host Energy Management Software ("EM Software") systems that allow users to manage associated EM components, networks and/or systems. An exemplary EM Software package is ION® Enterprise, manufactured by Power Measurement Ltd, of Saanichton, B.C. Canada. For the purposes of this application, a user is considered to be either a person or a component that interacts with, extracts data and provides commands and data to an EM component, EM network, or EM system.

EM components within the same network communicate with one another via channels. Components in different networks communicate with one another as well, possibly using different channels. A channel is essentially the infrastructure used to move data from one place to another, and can include public or third-party operated networks such as: Virtual Private Networks ("VPNs"), Local Area Networks ("LANs"), Wide Area Networks ("WANs"), telephone, dedicated phone lines (such as ISDN or DSL), Internet, Ethernet, paging networks, leased line; Wireless including radio, light-based or sound-based; Power Line Carrier schemes; spatial movement of data using Newtonian means including data stored in some format such as printed, magnetic, optical, flash memory, RAM, on a computer, Personal Digital Assistant ("PDA"), Hand-Held Format ("HHF") reader or other device, and transported by couriers, postal services or Meter Readers driving around in trucks.

VPNs connect disjoint parts of the same network. They also allow authenticated users to communicate securely over the Internet with a protected or private network. VPNs work by allowing client devices to securely communicate with a VPN concentrator or server. The client or concentrator may be embedded in another device such as a firewall or a router. This is particularly valuable when users are separated by geographic distance that otherwise limits their access to the protected or private network.

Power Line Carrier describes a family of networking technologies that enable computer and voice networking over existing electrical wiring.

Various protocols used in the system include but are not limited to: TCP/IP, Bluetooth, Ethernet, IEEE 802.11a, IEEE 802.11b and IEEE 802.11g, HTTP, SMTP, NNTP, POP, IMAP, IPSec, Trivial File Transfer Protocol ("TFTP"), Blocks Extensible Exchange Protocol ("BEEP"), Zigbee, MIME, SNMP, SOAP, and XML-RPC.

Many different data formats that may be used to exchange data, including but not limited to: binary, XML, XHTML and XHTML Basic, XHTML Basic as an Infoset in another form besides tagged text, Binary encoded equivalents of XML Infosets including Wireless Binary XML ("WBXML"), ASN.1 encoded XML, SVG, Direct Internet Message Encapsulation ("DIME"), CSV, XML RPC, SOAP (with signature at SOAP level and/or enclosed content level), SOAP (using WS-SECURITY with signature at SOAP level and/or enclosed content level), application specific content like spreadsheet data, an HTTP response to an unsolicited HTTP request, a response to an unsolicited message, HHF, PQDIF, MODBUS, ION®, or other SCADA protocol where a response can be packaged up and embedded in another protocol or format. These formats are frequently sent as MIME or UUENCODE attachments and are considered part of the protocol stack.

Most channels between components in an EM System are insecure channels subject to security attacks including malicious acts such as forgery, denial of service, invasion of privacy and so forth. Messages passed over insecure channels are subject to interception, tampering and fraud. Successful malicious acts may result in unintentional security breaches such as faults, power outages, financial losses, exposure of sensitive data, turning off or on equipment that other parts of system rely on, depriving use of the system, and so forth. Legitimate users may also unintentionally perform some action that compromises the security of the system.

As EM systems expand and incorporate public networks, particularly the Internet, wireless networks and telephone systems, the need for secure transfer of data becomes crucial. It is hereby the purpose of the disclosed embodiments to provide robust security to an EM Network or to an EM Device on a network.

There are many EM Systems and activities that require security due to economic impact caused by an antagonist preventing a valid action from taking place or initiating an undesired change in the electrical system. One application is EM Systems where EM Components are able to curtail loads or startup generators in response to an authorized command. Such a command may come from an energy analytics system or standard SCADA system that issues the command based on an economic analysis or an LSE with which the energy consumer has a curtailment agreement. EM Devices provide data indicating how much load has been curtailed, the current load, the current rate of greenhouse gas emissions, etc, to other applications in the system. These applications may be real-time energy analytics applications that make decisions based on the economics of curtailing loads or firing up generators or applications run by an LSE. In some systems, a message may be broadcast to thousands of loads via USENET, wireless, email, HTTP Rendezvous, Smart Personal Object Technology ("SPOT") etc.

HTTP Rendezvous is described in pending U.S. patent application Ser. No. 10/340,374 "PUSH BASED COMMUNICATIONS ARCHITECTURE FOR INTELLIGENT ELECTRONIC DEVICES" filed Jan. 9, 2003.

SPOT is a technology that uses the FM band and is coupled with a new digital radio infrastructure. Utility rates tables, firmware upgrades, time syncs and other unidirectional communications can be transmitted inexpensively to EM Components using SPOT.

Other applications include securely exchanging data across an enterprise or across insecure channels and perimeters to service companies who provide energy analytics services, billing and department sub-billing services, bill verification services, PQ Event analysis and classification, academic research into energy economics, or exchange of data with building management systems (i.e. to control thermostat limitations based on economic information determined by EM systems, or ERP systems for production planning, etc.)

Another application is where some information is sent to the consumer of energy for them to manage their usage, and some information is sent to the supplier to do billing.

Security Mechanisms

There are various techniques, including encryption, authentication, integrity and non-repudiation that provide secure communications. Encryption provides privacy by preventing anyone but the intended recipient(s) of a message from reading it. Authentication ensures that a message comes from the person from whom it purports to have come from. Integrity ensures that a message was not altered in transit. Non-repudiation prevents the sender from denying that they sent a message.

Various mechanisms can be used to secure parts of the system and the transmission process. Their particular applications to EM systems will be described in detail later.

With Public Key Encryption, each user has a pair of keys, a public encryption key, and a private decryption key. A second user can send the first user a protected message by encrypting the message using the first user's public encryption key. The first user then decrypts the message using their private decryption key. The two keys are different, and it is not possible to calculate the private key from the public key. In most applications, the message is encrypted with a randomly generated session key, the random key is encrypted with the public key and the encrypted message and encrypted key are sent to the recipient. The recipient uses their private key to decrypt the session key, and the newly decrypted session key to decrypt the message.

Digital signatures are provided by key pairs as well, and provide authentication, integrity and non-repudiation. In this case a sender signs a one-way hash of a message before sending it, and the recipient uses the senders public key to decrypt the message and verify the signature. When signing large documents it is known to take a one way hash function of the plain text of the document and then sign the hash. This eliminates the need to sign the entire document. In some cases, the digital signature is generated by encrypting the hash with the private key such that it can be decrypted using the signers public key. These public/private key pairs and associated certificate key pairs may be computed using hard to reverse functions including prime number and elliptic curve techniques.

One-way Hash Functions are small pieces of data that identify larger pieces of data and provide authentication and integrity. Ideal hash functions cannot be reversed engineered by analyzing hashed values, hence the 'one-way' moniker. An example of a one-way hash function is the Secure Hash Algorithm.

X.509 and PGP each define standards for digital certificate and public key formats.

Various encryption algorithms such as RSA, Advanced Encryption Standard ("AES"), DES and Triple DES exist. RSA is a commonly used encryption and authentication system for Internet communications.

Secure Sockets Layer ("SSL") creates a secure connection between two communicating applications. For the purposes of the disclosed embodiments, SSL and Transport Layer Security ("TLS") are equivalent. These protocols are employed by web browsers and web servers in conjunction with HTTP to perform cryptographically secure web transactions. A web resource retrievable with HTTP over TLS is usually represented by the protocol identifier "https" in the URI. TLS can and is used by a variety of Application protocols.

Secure HTTP (S-HTTP) provides independently applicable security services for transaction confidentiality, authenticity, integrity and non-repudiability of origin.

S/MIME and Pretty Good Privacy ("PGP") provide encryption and authentication for email and other messages, allowing users to encrypt a message to anyone who has a public key. Furthermore, a message can be signed with a digital signature using a private key. This prevents users from reading messages not addressed to them and from forging messages to appear as though it came from someone else.

Kerberos is a secure method for authenticating a request for a service on a computer network that does not require passing the user's password through the network.

Microsoft Passport is an online service that allows a user to employ their email address and a single password to create a unique identity. Microsoft Passport is manufactured by Microsoft Corporation of Redmond, Wash., USA.

Liberty Alliance Project is an alliance formed to deliver and support a federated network identity solution for the Internet that enables single sign-on for consumers as well as business users in an open, federated way.

Internet Protocol Security ("IPSec") secures IP traffic across the Internet, and is particularly useful for implementing VPNs. Point-to-Point Tunneling Protocol ("PPTP") is a protocol that allows entities to extend their local network through private "tunnels" over the Internet. This kind of connection is known as a VPN. Layer Two Tunneling Protocol ("L2TP") is an extension of the PPTP protocol.

The XML Signature syntax associates a cryptographic signature value with Web resources using XML markup. XML signature also provides for the signing of XML data, whether that data is a fragment of the document which also holds the signature itself or a separate document, and whether the document is logically the same but physically different. This is important because the logically same XML fragment can be embodied differently. Different embodiments of logically equivalent XML fragments can be authenticated by converting to a common embodiment of the fragment before performing cryptographic functions.

XML Encryption provides a process for encrypting/decrypting digital content, including XML documents and portions thereof, and an XML syntax used to represent the encrypted content and information that enables an intended recipient to decrypt it.

Web Services Security ("WS-Security") is a proposed IT standard that addresses security when data is exchanged as part of a Web Service. WS-Security specifies enhancements to SOAP messaging aimed at protecting the integrity and confidentiality of a message and authenticating the sender. It also specifies how to associate a security token with a message, without specifying what kind of token is to be used. It is designed to be extensible with future new security mechanisms.

A Media Access Control Address ("MAC Address") is a number that is appended to a digital message and provides authentication and integrity for the message.

Security Services

Figure 2:
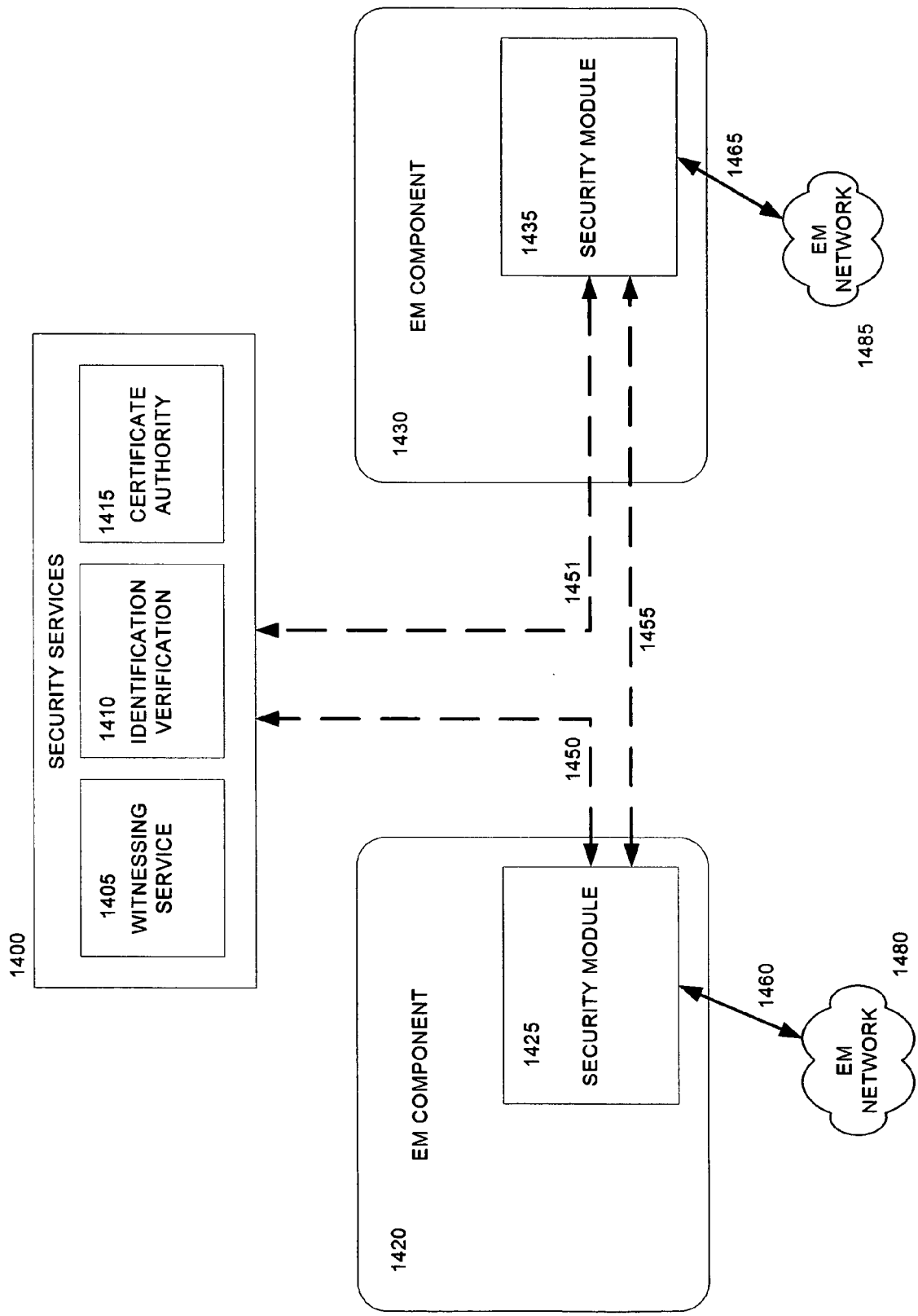
FIG. 2 depicts an Energy Management ("EM") system according to one embodiment.

Referring now to FIG. 2 various trusted Security Services 1400 exist to allow entities, systems or devices to communicate securely with one another and to provide access control to data and/or resources. These Security Services 1400 include such services as Witnessing Services 1405, Identification and Verification Services 1410, Certificate Authorities 1415, Certificate Revocation Services, Name Registries, Key Servers and Single Sign-On ("SSO") services such as Kerberos, Microsoft Passport and Liberty Alliance. These Security Services authenticate identity, validate and verify data integrity, provide non-repudiation, ensure contract signing, ensure signing of data by several parties where a signature is valid if and only if all parties sign the data.

Key Servers allow for public key and certificate exchange between various EM Components. The public key or certificate is published to a Key Server service or by the owner. The Key Server provides some sign-on mechanism. The Key Server can also provide certificate generation, key generation, installation certificates, revocation lists and Lightweight Directory Access Protocol ("LDAP"), or these functions can be provided by another security service. Certificate revocation lists are frequently exposed via LDAP and certificates can be revoked by EM devices in a secure fashion to prevent antagonists from revoking other's certificates. These revocation means include SOAP, HTTP, email, etc.

Devices can exchange their public information including identity and public keys with any entity they choose. It is often useful for a device to export a PKI certificate and/or public key so that recipients can use them for security operations later. Sometimes, the certificate or public key is sent in every message to simplify processing by the recipient.

It will be appreciated that although Security Services 1405–1415 are depicted bundled together under the general Security Services 1400 umbrella, that these Security Services 1405–1415 may be provided by one or more different organizations, and that Security Services 1405–1415 are shown bundled together for simplicity. Security Services 1405–1415 can be provided by EM Device or EM Software manufacturers, device or software owners, or by Trusted Third Parties ("TTPs").

EM Component 1420 contains a Security Module 1425, and EM Component 1430 contains a Security Module 1435. Security Modules 1425, 1435 provide similar functionality as the Security Module described in the aforementioned co-pending application. It is desirable for EM Components 1420, 1430 to communicate securely with one another. However, Security Modules 1425, 1435 require certain witnessing, identification, certification revocation lists, verification and authentication services. Therefore, EM Components 1425, 1435 are configured to use Security Services 1400 when communicating with one another. Alternately, EM Components 1420, 1430 use security services to implement system level security functions during communications or message processing. For example, EM Component 1420 may implement a security service to verify data sources from a system of devices.

Alternately, Security Module 1425 is directly programmed with security data. For example, Security Module 1425 is programmed or supplied with the public key or PKI certificate of EM Component 1430 and thereafter trusts that data signed by EM Component 1430 is in fact sourced by EM Component 1430. Such a relationship may be necessary if EM Component 1420 is unable to access Security Services 1400. Alternately, if Security Module 1425 is in possession of the PKI certificates of trusted CAs and trusts that those certificates are accurate, when it receives a certificate from EM Component 1430, it can use PKI techniques to see if that certificate is warranted by a trusted CA to be for EM Component 1430, and if the certificate is warranted, it can use the technique described above to decide when to trust data apparently from EM Component 1430.

Security Module 1425 is linked via channel 1450 with Security Services 1400, and via channel 1455 with Security Module 1435. Security Module 1435 is linked via channel 1451 with Security Services 1400. It will be appreciated that channels 1450, 1451, 1455 may be encompassed in the same network, and that the channels may be direct links, or may incorporate several intermediate servers, routers, firewalls, application gateways, protocol gateways, physical delivery mechanisms, and so forth that are presently omitted for clarity. It will be appreciated that entities exchanging data may comprise communication endpoints and/or loosely coupled applications that are not aware of the communications infrastructure.

Identifying EM Components

Before EM Components can communicate securely with one another they need to be provided with identities. The identity must not be easy to assume either intentionally or accidentally. Identities for EM Components also provide a guarantee or an assurance that EM data comes from a given source EM Component and has not been tampered with or corrupted.

Identities are particularly relevant in multi-site scenarios, where EM data is aggregated across a wide geographic area containing multiple sites, serviced by multiple utilities, each site operating on one or more utility rates. Each EM component in the system needs to identify itself, particularly when reports are run across multiple databases or against aggregated data, or when the EM data has financial implications. In this case, before data from an EM component is inserted into a central storage location the EM component will be identified and a check will be made to see if its data is already in the central storage and if so it will not be inserted again. Furthermore, in order to take advantage of third party services, EM components need a way to identify themselves to Web services or the world in general in a standard and easy way. Identity can be used both to authenticate a user and also to provide access control to resources.

This identity can be implemented using various values, including MAC address, Universal Unique Identifier ("UUID"), TCP/IP address, DNS name, email address, serial number, a unique string of characters issued by an authority, such as a URI, a device type, a name or an identifier of one or more authorities.

A UUID is a 128-bit number or a representation thereof that can be used to identify components. The possibility of duplicate UUIDs being generated by the well-known UUID algorithms is so remote that UUIDs are considered unique.

An SSO service such as Microsoft® Passport, Liberty Alliance, Kerberos, XML Web Service, or a manufacturer hosted identity server can be used to assign identity. Microsoft® Passport uses email addresses to identify users, including EM devices. XML Web services implement signatures and encrypted data using XML Signing and XML Encryption. Most of these systems do not require the disclosure of a password by the EM device. Communications with them can be made secure by using any one of TLS, SSL, IPSec, VPN, or other communication endpoint protocols that have security built in. Once the identity is assigned, the EM component can access other resources to which it is authorized, send or receive verifiable data to or from other devices, and may provide access to other entities of its own resources. The EM Component can use a SSO or public key to be assigned new keys and certificates or to publish new public keys and certificates it has assigned itself.

When email addresses or URIs that are URLs are used to identify EM Component 1420, EM Component 1420 has the ability to receive messages at the corresponding email address or URI and respond to the sender. This provides a basic way to deliver or retrieve secrets from EM Component 1420. This basic security arises from the fact that it is somewhat difficult to intercept messages to named devices within a short timeframe.

Assigning the Identity

It is imperative that no EM components have the same identity, so when two or more entities or authorities are assigning identifiers to EM Components, it is possible that the same identity will be assigned to different EM Components. It is therefore preferred that the entity or authority name be a significant portion of the identity. A process of inserting an identity in all EM Components at manufacturing or repair time provides a useful identity for further use by parties involved in exchanging EM data in a secure fashion.

To protect its identity, EM Component 1420 should store the identity in a location that cannot be easily accessed or replaced. A poor place to locate the identity would be on a card that can be moved from one component to another, such as an Ethernet card. In one embodiment, the identity is located in the EM Component 1420 firmware, protected by a mechanism that detects corruption or tampering of the device identity. In a second embodiment, the identity is stored in a dedicated, secure area of memory. Security Module 1425 manages the integrity of the identity.

In one embodiment, EM Component 1420 is assigned two pairs of one private key and one digital certificate each during manufacturing. The certificates are signed by the manufacturer and contain various items necessary for PKI infrastructure including the device identity. The first key/certificate pair is a signing private key (the device identity signing key), and verification certificate (the device identity verification certificate), which are used to sign and verify EM Component 1420 data. The second key/certificate pair is a decryption private key (the device identity decryption key) and an encryption certificate (the device identity encryption certificate), used for encryption and decrypting EM data published by EM Component 1420. In one embodiment, the same key pairs and certificate are used for signing and decryption. Alternately the two keys are stored only on EM Component 1420. The two certificates are stored on EM Component 1420 and also on a mission critical server provided by the EM device manufacturer as Security Service 1400. If EM Component 1420 fails or is stolen, the certificates can be revoked through interaction with the Security Service 1400. Any signed data from EM Component 1420 can be verified by checking the signature against the document and the certificate against the certificate authority provided by the manufacturer. Now EM data published by EM Component 1420 can be verified separately from the message and protocol transporting the EM data.

PKI certificate based authentication schemes are better for machine-to-machine authentication. In this case, EM Component 1420 is issued one or more PKI certificates, associated identities and identity-related secrets, such as private keys, during manufacturing. This eliminates the need for EM Component 1420 to use an authentication service such as Kerberos. EM Component 1420 need never send a password or other identity-related secret. This provides for a more efficient implementation on EM Component 1420 and a simpler overall system, as EM Component 1420 does not need to interact with Security Service 1400 during operation. Instead, EM Component 1420 signs data using its private key.

Alternately, an identity and certificate are assigned by an authority unrelated to the device manufacturer and transferred to EM Component 1420 in a manner that keeps all secrets private. This can be accomplished by using a secure protocol, a network on which antagonistic traffic will not be present, or by installing physical hardware on EM Component 1420 that already has a certificate and identity related secret on it. Multiple device identity and/or certificates can be assigned to EM Component 1420 by one or more authorities.

In the above embodiments the identity related secrets are assigned to the device. In an alternative embodiment, EM Component 1420 generates its own key pairs with an algorithm and provides the public key to an authority. The authority generates a PKI certificate that it provides to EM Component 1420.

Device identity Versus Metering Point Identity

Where EM Component 1420 is an EM Device or EM Gateway, there is often a need to distinguish between the identity of the device and the identity of the metering point that device is measuring. The device identity could be the serial number, serial number/device type combination, MAC address or UUID assigned to the device, whereas metering point identity relates to the physical location where the device is installed or the specific purpose of the device. A consumer of data from the device wants to be sure that the data they are receiving purportedly from that device is in fact from that device (guaranteed by device identity) and also from the physical location (guaranteed by metering point identity) the device was installed at. It will be appreciated that in some cases a single EM device may be metering multiple points. In the case where there are multiple users of the EM data, every user needs to trust that the data they are receiving is reliable, and has not been tampered with by another user. For example, it would be fairly easy for the antagonist to commit fraud or other forms of havoc, including financial or even grid operational by using a rogue device.

This problem can be solved by issuing EM Component 1420 two identities and associated security password or key pairs/certificates, usually issued by two different authorities, one for device identity and one for metering identity. Each authority is a CA or SSO, and must be trusted by all users of data from the device. The authority for the metering point ensures that there is only one device with an identity for a particular metering point. This provides a mechanism for the authority to guarantee to their users which devices are associated with specific metering points and for users to verify data coming from a device is in fact from that device. To verify the data is from a particular device and a metering point, the data must be verified using both security systems. EM Component 1420 provides an interface that allows it to be assigned a password and/or key pairs and certificates and metering point identification. In one instance, both systems are PKI and the device signs the data with two different private keys, one from each PKI. A recipient uses both signatures to verify that the device and not a rogue antagonist sent the data, and that the device is associated with the correct metering point.

In an alternate embodiment, a seal is applied when EM Component 1420 is installed at the metering point. This seal guarantees that the device has not been moved from that point. This seal can be as simple as a switch that is automatically opened when the device is removed from a socket. Once the switch is opened, the seal is broken. If it is moved for any reason, either unintentionally or maliciously, the seal is broken, and the Security Module 1425 revokes access to the metering point from the authority. The metering point identity can be either disabled or erased.

In an alternate embodiment device removal can be detected through an embedded global positioning system ("GPS") installed in the device. Furthermore, as device downtimes and outages in various areas are usually known, device downtime can be correlated with known power outages in that area. The comparison could happen at the authority or on the device depending on who sends outage/downtime data to whom.

Identity Name Registry

A name registry maintains a database of device identities, associated EM devices, and the times at which they entered and left service at a specific metering location. For example, EM Component 1420 is assigned an identity, and recipients of EM Component 1420 data, such as EM Component 1430, can easily verify the source of the data, and that the certificate is a currently valid certificate issued by the EM Component 1420 manufacturer, by using PKI techniques. EM Component 1430 maps the EM Component 1420 URI to the Metering Point URI either by using a secure service, typically an XML Web Service, provided by the registry owner as a Security Service 1400, or by using a local copy of the registry it has previously retrieved. Where an EM device vendor does not provide or comply with a known URI scheme, the owner of the name registry could define a URI scheme for the vendors' equipment, as long as the EM device has a set of identifying attributes such as MAC address or serial number. The registry must be updated whenever an EM device is brought into or removed from service. The registry may be implemented as a distributed registry with a host name encoded within the Metering Point URI corresponding to a registry for that particular host. Alternatively, the registry can be implemented as a single large database. The registry can be implemented as a relational database, XML files, Comma Separated Value ("CSV") files, or Resource Description Files ("RDF"), or any mechanism that allows associated lookup when combined with the appropriate software. The registry enforces uniqueness of metering point URIs, thereby preventing two devices from having the same URI at the same instant. In the case of the distributed registry, a registry server would be placed on the host. The best way to update the registry is using web services that employ some form of security typically used with web services, like Kerberos or a PKI scheme employing PGP or x.509 certificates. Various techniques can be applied to ensure that the registry remains up to date, including requiring device owners to update the registry within a business day of exchanging the EM Component 1420 at a metering point. The registry could also report errors and changes, allowing reports to be re-run with the up to date information. When the registry changes, notifications can be communicated to entities needing to know about the updates. Some good techniques to do this comprise: email, USENET/NNTP, HTTP, TLS, SSL, S/MIME, RDF, Rich Site Summary, RDF Site Summary, Really Simple Syndication, or CSV. This scheme easily supports the replacement of installed EM devices that were assigned a specific metering point identification and removed because they failed, were upgraded to better versions or were sent for scheduled testing to ensure they are still reading correctly.

Encryption, Authentication, Intergrity and Non-Repudiation

When two entities, particularly unrelated entities, share information, such as significant EM Data, including data that has economic consequences such as energy profiles, WAGES profiles, revenue data and so forth, the entities want to be sure that the transmission is private and/or the recipient of the data can trust the source and the content. When an EM Device receives data such as a control command, or economic data such as pricing information, it is critical that the device can authenticate the sender and be sure of the integrity of the data.

Servers will frequently archive, forward or embed the contents of an encrypted or signed message, losing the encryption and signing in the process. In some cases, a first piece of verifiable data is sent to a first destination, and some action such as aggregation or calculation is performed using the data to produce a second piece of data. The two pieces of data are now sent to a second destination, and the recipient wants to verify that neither piece of data has been tampered with. Various techniques can be employed that allow for the archival, forwarding and embedding of EM data while retaining a way to verify that the data source is authentic and that the data has not been tampered with. Such techniques will be discussed in greater detail below.

Encryption provides privacy by preventing anyone but the intended recipient of a message from reading it. Encryption can be provided point-to-point, or end-to-end, depending on the nature of the channel and the data. Only a portion of the data may be encrypted. EM Components can encrypt messages using encryption schemes such as PGP, S/MIME, XML Encryption, or SSL.

Signing data provides assurance that the data comes from the desired source, and that it has not been tampered with. Signing helps prevent so-called "man in the middle" attacks where someone with legitimate or illegitimate access to data intercepts the data and tampers with it or forges data. This can occur with all aspects of communication, including installing certificates, and exchanging frameworks and all types of EM data.

Non-repudiation prevents the sender from denying that they sent a message. Non-repudiation can be provided by signing, electronic witnessing and technologies that assert a document was read before it was signed. Similar techniques exist for ensuring non-repudiability of contracts. Where EM Component 1420 is an EM Device, EM Component 1420 can sign data, data packets or messages using PGP, S/MIME, XML Signature or TLS/SSL to provide for non-repudiation of those messages or data.

Where EM Component 1420 is an EM Device, computing cipher data and transmitting signed data can be computationally too expensive to perform in real time, or require too much memory. Cipher data includes hashes, digital signatures, and encrypted data. There are several ways to reduce these costs or amortize them over time.

In one embodiment, Security Module 1425 compresses the data before calculating the cipher data, and the cipher data recipient decompresses the data before reading it. The cipher data, which may be compressed data, is generated incrementally in advance of the need to send it. This is very useful when the data is being generated over a long period of time. When it is time to send the cipher data, it is already computed. If the cipher data is a security hash, the data is streamed out to a buffer or register in the format that it will be signed and sent as, the data is used in the computation of the digest or hash value, and the data is thrown away. A variety of buffer sizes can be used, and the frequency of updating the hash can vary as well. When the data needs to be sent to a recipient, the signature is already calculated and EM Component 1420 streams the data without performing any potentially expensive hash functions and includes the pre-calculated data according to the security scheme. The data and signature can be encoded according to S/MIME, PGP or various other formats. This technique is useful for higher-level protocols or formats, like S/MIME, PGP, or XML Signature, because the plaintext doesn't incorporate time varying or packet based protocol information. In contrast, lower level protocols like IPSec may incorporate protocol information that cannot be computed in advance in the plaintext, so the cipher text cannot be computed as far in advance.

In an alternate embodiment, the process is modified to stream canonical XML or some other format compatible with XML signing to the buffer so that the signature will be compatible with the XML signing specification of the World Wide Web Consortium ("W3C"). The actual XML transferred to a recipient may be formatted differently from the format used to generate the signature, but the recipient can still verify the signature by transforming the received XML to the format used for the generation of the signature. In this case, XML Signature can be used to authenticate the signature or hash. This strategy makes it possible to generate authenticable load profiles in advance without using much memory, which can be quite valuable when EM Component 1420 has a slow processor.

In an alternate embodiment, messages are sent only occasionally. When the messages are processed by an automated system and reports are only created every day, or week, or month, there is some leeway in when the data must be sent. In this case, encryption and signing calculations can be executed only when there is free processing time. This scheme works well on EM devices where important real-time calculations can take up to 100% of available calculation time for small periods, but over time periods of a few hours there is processing time to spare.

In an alternate embodiment, encrypted data is streamed across the Internet as it is generated using the aforementioned techniques. This has the advantage that EM Component 1420 does not need to store encrypted data.

In an alternate embodiment, EM Component 1420 contains a removable storage device that can contain EM data. This removable storage device may be removed from time to time to upgrade configuration data, or to download stored data. The EM Component 1420 may be fitted with a physical lock that prevents unauthorized individuals from taking the removable storage device.

Signing

EM Component 1420 transmits a message to EM Component 1430 that contains the data or encrypted version of that data that is being exchanged in a secure fashion. The message may also contain a public key, a PKI certificate, and one or more message digests, which are electronic signatures.

In one embodiment, this signing is implemented using XML signing technology. XML signing technology allows the signing of a portion of an XML document by various parties. An XML document can contain a signature that references portions of the signed document; that is, the data and the signature are in the same document. To allow for verification, EM Component 1420 produces an XML document with EM data and a signature of the EM data. This XML document can now be verified separately from the transport mechanism that it was delivered with. Because the document is an XML file it can be processed with typical XML software tools such as Extensible Stylesheet Language ("XSL") and Document Object Model ("DOM"). The document can be archived or embedded in another document while maintaining the verifiability of the signature. This can be of particular value when the document contains energy readings and a bill for that energy. The bill receiver will have confidence that they are being billed for the correct amount of power consumed.

Alternate means for providing signing include employing S/MIME, PGP, using XML Signature in a manner compatible with the WS-Security SOAP format, signing a row of data when the data are tabular or where the data is in rows, signing a tuple of each datum and the time associated with that datum, storing the signature in one or more fields or registers in a register or binary based protocol such as those used by MV90, MODBUS® or ION®.

In an alternate embodiment if the data and/or hash are not XML, the signature or message digest can be created by appending the fields together in some manner including but not limited to: appending the bytes of the fields together; converting the data to a form of XML and using the XML Signing techniques; converting to CSV and then signing the rows. It will be appreciated there are many ways to do this.

Entities with different identities can sign different data. For example, an entity may sign a SOAP message indicating that the sender is a particular device authorized to send data to the receiver, and the signer of data within that message may be the entity that actually measured that data. One instance when this is useful is when secure data is gathered from a device, the data is stored and sent to another system later on.

In operation, before EM Component 1420 transmits a message to EM Component 1430, if it does not already have in its possession the public key of EM Component 1430 it requests it from Security Services 1400 via channel 1450. Security Service 1400 returns the public key of EM Component 1430. Security Module 1425 encrypts the message using the EM Component 1430 public key, signs the message using the EM Component 1420 private key and transmits the message over channel 1455 to EM Component 1430. Security Module 1435 now requests Security Services 1400 for the public key of EM Component 1420 via channel 1451. Security Services 1400 returns the public key of EM Component 1420 via channel 1451. Security Module 1435 decrypts the message using it's own private key, and uses the EM Component 1420 public key to verify the integrity of the received data. It will be appreciated that public keys are typically represented by means of certificates that encapsulate the key and other information that a CA warrants about the owner of the certificate. It will also be appreciated that one or more parts of the message described above may be encrypted or signed.

In an alternate embodiment, EM Component 1420 and EM Component 1430 may cache the others public key in a safe place, and refer to that when encrypting and verifying, only checking in with the Security Services 4100 on a periodic basis. This reduces traffic and the need for a connection to the Security Services 1400, and speeds up the verification process.

In an alternate embodiment, where EM Component 1420 and EM Component 1430 are communicating via email, a certificate is attached with the message.

In an alternate embodiment, EM Component 1420 and EM Component 1430 each send a certificate to the other party before starting to send signed messages.

In an alternate embodiment, EM Component 1420 is transmitting HTML to EM Component 1430. Once again there is a need to protect the content of the transmissions between the two components 1420, 1430, and to verify the source of the data. Current designs implement this security at the transport level using SSL. This solution is problematic however, as SSL is processor intensive and is also encrypted and not cacheable by proxy servers. Instead, the XHTML data is signed using XML signing techniques described by the W3C. An XHTML module can also be provided if one is not publicly available to represent the signature in XHTML in a specific way. Then a browser plug-in may be created if the browser vendor does not support XHTML or XML signing. In this case the HTML data is signed, allowing standard PKI techniques to be used to verify the HTML data is from the source it claims to be and that the data has not been tampered with. If the HTML document is then saved, it remains verifiable, as the signature remains intact and valid. The HTML document can be cached in a proxy server for efficient system deployment.

A stand-alone message may be carried through a variety of transports and protocols as it travels from EM Component 1420 to EM Component 1430. The message may even change format; for example, the same XML Infoset can be represented in different serializations such as canonical and WBXML. In a message such as an XML or SOAP message, the authentication token may only authenticate a portion of the message, or the entire message.

In an alternate embodiment, any stored data, including cached data and data stored in a database, is tagged with a digital signature. When the data is retrieved, the digital signature can be used to verify that the data has not been tampered with over time.

In an alternate embodiment, where EM Component 1420 is an EM device, EM Component 1420 is producing a series of periodic readings of various parameters. Based on the readings and the time, a digital signature is produced and placed in the recorder, possibly as another channel. In this context, a channel is a column in the recorder, the column having a defined meaning. Alternately a row in the recorder is used to store a signature of a predefined number of previous rows. The EM data and signatures are retrieved and stored in a central data collection or billing system on EM Component 1430. An application validates that the readings are authentic and flags the ones that are not. For added security, Security Module 1425 can also encrypt the data before transmitting it. The EM data and signatures can be regenerated from the database to verify the provenance of the data at a later time.

In an alternate embodiment, the EM Component 1420 private key is used to sign firmware or frameworks or a hash or digital signature thereof after they are installed on EM Component 1420. EM Component 1420 occasionally verifies the signature to ensure that the firmware and/or framework has not been tampered with or corrupted. One advantage of using a signature over a CRC check or other one-way function is that an antagonist will find it very difficult to forge a signature whereas they could forge a CRC after tampering with the firmware.

Measurement Assertion Techniques

A consumer of data may wish to verify that received data represents what the data provider claims it represents. It is difficult for a user to confirm the calculation techniques, source registers and source modules used to arrive at a value, so some techniques are needed to aid in this.

Where EM Component 1420 is an EM device, EM Component 1420 produces values based on registers or modules. These registers or modules typically have no indication of the measurement they represent. The vendor and/or technician who configured EM Component 1420 affirms that the register or module value asserts a particular measurement. To ensure that the consumer of that value knows that they are getting the asserted measurement, some fundamental information about how that measurement is produced is provided. This information is digitally signed by the asserter so that the consumer knows the identity of the entity making the assertion, and the technique used to calculate the measurement. This description may take the form of an XML document. A method of verifying that this set of registers or modules is in use in the actual device providing the measurement is also necessary.

In a related scenario, the consumer of EM firmware or frameworks requires confidence that any firmware or frameworks they are uploading to EM Component 420 have not been forged or tampered with, and that they are released, supported versions. Signatures and certificates are either included in the firmware or framework file, or in a file separate from the firmware or framework. The certificates are revoked if there is a product hold on the firmware, or if it is out of date. The firmware upgrade program warns the user not to upgrade firmware that is unsigned, or firmware whose signing certificate has been revoked. A list of valid and revoked certificates is stored on a mission critical server, which may be provided by the device manufacturer as a Security Service 1400.

Software may check for valid signatures before an upload is attempted, and only allow certain users to upload unverified firmware. The firmware itself may verify signatures to ensure firmware has not been tampered with and is from an authorized source, and that the entity attempting the upgrade is authorized to perform an upgrade. Third parties may upload their own firmware written in their language of choice, such as Java, Prolog, Haskell, binary executable code, C#, ECMA Common Language Runtime ("ECMA CLR"), or ION® Object Configurations. Depending on the platform, source code or some repurposed version of the source code (i.e. ECMA CLR or target processor machine code) is digitally signed by the party and uploaded. Such code would be allowed to perform only specific actions based on trust level of the signer. For example, unsigned code or code signed by a non-trusted entity might only be allowed to read registers. A subsystem would prevent the client's code from performing invalid operations, such as accessing memory it shouldn't. That may require that the compiled code is Java, or ECMA CLR code that the subsystem can prove is not damaging. Allowing binary code to be deployed may not be automatically verifiable, in which case only trusted users may be allowed to upload it.

In an alternate embodiment, a framework designer designs forms that framework operators will enter values into while programming EM devices. The framework has a built in form allowing the framework or specific configuration values within the framework to be changed. The forms may be built with various technologies, including HTML, XFORMS, or XML E-Forms developed by PureEdge Solutions of Victoria, BC, Canada. The framework designer signs the framework using PKI techniques and arranges for a timestamp from a Security Service 1400. A template is created from a framework, using the framework and an optional firmware specification. A framework operator enters values onto the forms, signs and uploads the framework or template to EM Component 1420.

Any entity receiving EM data from EM Component 1420 can't be sure if they should trust the data. Each message they receive from EM Component 1420 contains a template signature from the framework designer, a signature about the configuration by the framework operator, the message contents (such as load profile), and a signature from EM Component 1420 that verifies that it created the message contents, and that it has verified that the framework operators' signature matches the configuration uploaded by the framework operator, and that the template signature by the template designer matches the template on the EM Component 1420. The recipient can verify the message by comparing the signatures by the framework operator and framework designers of the configuration parameters and template to the expected signatures, and verify the message signature by EM Component 1420 is valid and from a trusted source. This strategy provides non-repudiation of the framework design, the configuration of EM Component 1420, and of EM data from EM Component 1420. A typical application for this is in Utility Meter Shops.

In an alternate embodiment, where EM Component 1420 is an EM device, the consumer of data (EM Component 1430) knows and approves of certain device configurations for EM Component 1420 that include the firmware, software, configuration parameters, and frameworks. EM Component 1420 produces a value representing the configuration using a known algorithm of its configuration, and the recipient EM Component 1430 generates a value using the same algorithm using an approved configuration for EM Component 1420. This value is a fingerprint of the device configuration. Functions suitable for generating such fingerprints typically have the property of easy computation of the value, while being hard or impossible to compute the input from the value and being collision resistant, that is, it is hard to find two inputs that have the same fingerprint value. The data EM Component 1420 sends is in some way combined with the fingerprint value and then EM Component 1420 signs this aggregate before sending. In another embodiment, a hash of the data and the fingerprint token are combined, and the signature is generated based on the combinations of these two security tokens. In another embodiment the fingerprint is appended to signed data and is signed again or vice versa. In another embodiment, the device configuration itself is used as its own fingerprint. It will be appreciated that there are many ways of securing this transaction. The receiver, EM Component 1430, of data can now employ PKI techniques to verify both that the data has not been tampered with and was generated by EM Component 1420 while in an approved configuration.

In another embodiment, EM Component 1430 is not concerned about approved device configurations; it simply wants an assurance that something that is purported to be a measurement is in fact that measurement with some chain of accountability. For example, if A can be trusted as honest, and 'A states "B has value $\beta$"' can be trusted, then EM Component 1430 can believe that B has value $\beta$. A statement like "B states t" can be trusted by a receiver of such statement from B by verifying an electronic signature of B. If it turns out B is lying, B can be held accountable later on.

Statements can be made by PKI certificate issuers about the identity and trustworthiness of those receiving certificates to perform certain actions. Owners of such certificates may make assertions about other entities such as devices, companies, or people. Those assertions may be more along the lines of security assertions like the ability to issue certificates to certain other entities, or other things, like trusted to create or configure device firmware or device configuration parameters. If the recipient of EM data is provided the set of assertions and a set of rules of when to trust statements, then that recipient can decide whether EM data received from an EM Device should be trusted. It will be appreciated this can be complex, as statements may include statements about further reifications. This inference process can be combined with the process of verifying that certain firmware or configuration or certain subsets thereof were used to generate the EM data.

Federated Security

As described above, a Non Affiliated Entity ("NAE") is an organization, individual or group of entities that may share some information with each other but are not closely tied, such as a group of competitor utilities. In conducting their operations, two or more applications or organizations (NAEs) may not fully trust one another, but wish to share some EM data and resources. These NAEs identify users, such as EM devices, using a "federated security" scheme that may be based on Kerberos, described above, which allows users from one NAE to be identified to another NAE. Web service security can be combined with federated security based authentication and access control to provide for secure exchange of EM data between users of different NAEs.

Federation is a technology and business agreement whereby users (including non-human users such as EM devices and EM software) that are part of a single or separate organization are able to interact through a system of authentication that allows for distributed processing, data sharing and resource sharing.

Federation describes scenarios in which no one group or organization manages all users and resources in a distributed application environment. Instead, administrators in diverse domains manage local security policies that support mutually beneficial transactions among their respective spheres of operation. The term federation derives from the Latin word for trust. In the world of distributed network services, the term refers to the need for trust agreements among decentralized security and policy domains. Federation lets access-management functions span diverse organizations, business units, sites, platforms, products and applications. Federation may require that an organization trust each trading partner to authenticate its own users' identities. In an exemplary federated environment, a user can log on to his home domain and access resources transparently in external domains, such as those managed by customers or suppliers, subject to various policies defined by home and external administrators.

Referring back to FIG. 2, in one embodiment, EM Component 1420 may include a computer, running EM software, that needs to retrieve EM data from EM Component 1430, which is an EM device owned by an NAE (not affiliated with the entity which owns or is otherwise operating EM Component 1420). Alternatively, as described above, either or both EM Components 1420 1430 may comprise IED's or other devices. The organization to which EM Component 1420 belongs, referred to as Organization "A", is authorized to retrieve certain types of EM data from EM Component 1430. This authorization has been established under the described federated security mechanism through an exchange of trust between Organization A and the organization which owns or operates EM Component 1430, referred to as Organization B. By virtue of this trust established via the federated security scheme, Organization A, or an administrator related thereto, may also delegate which members, or devices, of the organization are allowed to retrieve this information from EM Component 1430. When EM Component 1420 attempts to communicate 1455 with EM Component 1430, as described herein, the federated security infrastructure may intercept the message from EM Component 1420, allowing the message to proceed to 1430 if and only if Organization A asserts that EM Component 1420 should have access to the data requested of EM Component 1430. Alternatively, EM Component 1430 may receive the message from EM Component 1420, verify the identity of EM Component 1420, as well as the provenance of the request, using PKI, described above, and use the federated security infrastructure to verify that Organization A has asserted that EM Component 1420 has the permissions to retrieve the EM data requested from EM Component 1430.

These schemes provide authentication of data source and integrity between applications and users in different organizations while limiting access to resources between private networks.

Security Godfather described in the aforementioned co-pending application, there are various reasons including cost and legacy equipment that might prevent some EM Components in a system from having their own security module. Referring again to FIG. 1, the Security Module 1425 of EM Component 1420 provides access to Security Services 1400 for the EM Components (not shown) located in EM Network 1480, and Security Module 1435 of EM Component 1430 provides access to Security Services 1400 for the EM Components (not shown) located in EM Network 1485. EM Networks 1480, 1485 can be made more secure using physical security techniques.

Integrated EM Security System

Although protecting components and channels of a network and system is important, the key is to tie the various security mechanisms together into an integrated, secure EM System. The security of a system is only as strong as the weakest link, so placing security features on various components in a system and leaving other components exposed opens the system to attack. It is necessary when designing and configuring a system to consider all components and how they interact.

In a naïve system a single perimeter may be erected around an EM System, designed to keep unauthorized users and problems out. However, this system will be ill-equipped to handle attackers that have managed to bypass the external perimeter, and users with malicious intent who are authorized to access components within the perimeter. Instead of a single perimeter protecting an EM System, multiple layers of security are needed, where an authorization must be produced to gain access to various areas. This authorization is managed by the security system once a user has logged on. Setting up specific access levels for accessing various parts of the system and assigning access levels to each authorized user helps to prevent malicious intruders or employees, or misguided employees from creating havoc.

Referring now to FIG. 3, EM Components 1510, 1520 each contain a Security Module 1515 and 1525 respectively. Security Modules 1515, 1525 communicate via channel 1530. EM Components 1510, 1520 together form an EM Network 1505. EM Components 1560, 1570 each include a Security Module 1565 and 1575 respectively. Security Modules 1565, 1575 communicate with each via channel 1580. EM Components 1560, 1570 together form an EM Network 1550. EM Networks 1505, 1550 communicate with each over via channel 1540. Security Modules 1515, 1525 of EM Network 1505 are able to communicate with Security Modules 1565, 1575 of EM Network 1550 via channel 1540. EM Network 1505, 1550 and channel 1540 form an EM System 1500. EM System 1500 allows disparate users to communicate and access remote resources in a secure fashion. It will be appreciated that EM Network 1505, 1550 may contain additional EM Components not shown in this figure and that EM System 1500 may contain additional EM networks not shown in this figure.

It will be appreciated that components in this system can be separated by network boundaries, perimeters, firewalls, servers, router, communications links, and protocols that are omitted here for clarity. However, EM components can send data to one another without worrying about intermediaries that the data passes through. Some EM Components have user interfaces and direct user access, whereas others may only be available via remote access. Not all EM Components have a Security Module, some may be inherently secure based on physical location and other factors, or may receive security services from other EM Components. In some cases, rather than distributing security modules across a system, it may make more sense to provide a security server that manages security for a whole system.

Security Modules 1515, 1525, 1565, 1575 protect the system, detect that there is an attack or intrusion, and react appropriately to the attack. They are capable of sharing security information with one another. They can share logon and permissions, report security breaches, manage perimeter security, analyze an attack, identifying the location and what is affected, take some defensive action and provide security for both local and remote EM devices.

In one embodiment a database that includes access rules for users is integrated into the EM System 1500. This database could be stored on a server (not shown), which is accessible by Security Modules 1515, 1525, 1565, 1575. This database centralizes and simplifies user authentication and management of user/access privileges by including rules about who can do what, and only allowing certain users to do certain things. Keeping this database up to date is important, so that it mirrors all changes in employment status and responsibility level.

In an alternate embodiment, a limitation is placed on those who can access a system remotely.

In an alternate embodiment, access control rules are enforced between all components, with pre-defined rules of which components can communicate with which other components, and what they are allowed to communicate.

In an alternate embodiment, a distributed firewall is implemented; this entails placing the firewall on the various components of the system, rather than at the perimeter of the network.

In an alternate embodiment, one or more VPNs are employed to provide additional security.

In an alternate embodiment, EM System 1500 incorporates integrated sub-systems including cameras, biometric authentication, smartcards, access tokens and other types of security devices. These devices may be implemented on one or more Security Modules 1515, 1525, 1565, 1575. Security Modules 1515, 1525, 1565, 1575 share security information with one another. For example, a user could log onto EM Component 1510 either locally, or remotely from EM Component 1560. Based on the access rights pre-assigned for that user, they may be able to access various resources and controls on other EM Components 1520, 1570 in the EM System 1500, without logging on to those components. Alternately, that user may be prevented by accessing any components and resources in EM System 1500 because they could not correctly authenticate. Access tokens, smart cards and biometric authentication prevent users from inadvertently revealing their passwords.

In an alternate embodiment, EM System 1500 implements an Intrusion Detection System, perhaps on one or all of Security Modules 1515, 1525, 1565, 1575, that is able to detect an attempt to compromise the integrity of the system. The identification of unauthorized attempts can be implemented by monitoring patterns of access and behavior on individual EM Components 1510, 1520, 1560, 1570, on EM Networks 1500, 1550, or on an entire EM system. Methods of monitoring include supervising network traffic and analyzing it for unusual activity and access attempts, using rules that determine who can access what, using statistical or artificial intelligence techniques, reviewing system, event or audit logs looking for anomalies, or some combination of these methods. The Intrusion Detection System has the capability to take remedial action such as publishing an alarm, shutting down the system, logging the attack, and reporting the attack to a central server or pager. The Intrusion Detection System may choose to not respond to certain types of requests if it thinks it may be under attack, preventing the attacker from intruding further into the EM System 1500.

The Intrusion Detection System can employ various techniques such as honey pots and burglar alarms to distract or identify would be intruders. A honey pot is a part of the system that looks particularly attractive to an intruder, but in fact has been planted there for the purpose of gathering data about the identity of the intruder and what they want to do, without allowing them to access the real system. Burglar alarms are devices or pieces of software that alarm when they are accessed. They are positioned to protect sensitive applications or data, and may be configured to alert the whole system that it is under attack, or to contact an administrator.

The system creates an audit trail or event log of all security sensitive events, such as connection attempts, data upload and download attempts, and attempts to alter configuration settings. The event log records such details as timestamp, success of the attempt and address the attempt was generated from.

It will be appreciated that the various security means previously described provide more effective protection when they are layered together, as the system becomes more difficult to intrude. For example, EM System 1500 can be protected by firewalls around each EM Network 1505, 1550, firewalls in various EM Components 1510, 1520, an Intrusion Detection system as discussed earlier, and the application of cryptography to all communications.

Business Process

A company provides a business process wherein the key business strategy is selling secure EM Systems. This could involve providing security services to EM device and software suppliers, owners or users. It can also involve providing security insurance against things such as data theft, viruses, intrusions, security breaches; loss of income resulting from the previous, and damages when confidential information is stolen.

It is therefore intended that the foregoing detailed description be regarded as illustrative rather than limiting, and that it be understood that it is the following claims, including all equivalents, that are intended to define the spirit and scope of this invention.

I claim:

1. An energy management system for managing an energy distribution system, the energy management system comprising:

first and second energy management devices, the first energy management device being affiliated with a first entity and the second energy management device being affiliated with a second entity different from the first entity;

wherein at least the second energy management device includes:

an energy distribution system interface operative to couple the second energy management device with at least a portion of the energy distribution system;

a processor coupled with the energy distribution system interface and operative to generate energy management data therefrom; and a security device coupled with the processor and operative to provide access data identifying entities and affiliates thereof, unaffiliated with the second entity, which are permitted to access the energy management data;

the energy management system further comprising:

a network coupled with the first and second energy management devices and operative to facilitate communications therebetween; and wherein the first energy management device is operative to request at least a portion of the energy management data from the second energy management device via the network, the request including an assertion of authorization to access the energy management data, the processor being operative to validate the assertion via the access data provided by the security device and limit access to the energy management data based thereon.

2. The energy management system of claim 1, wherein the security device is external to the second energy management device.

3. The energy management system of claim 2, wherein the security device is coupled with the network.

4. The energy management system of claim 1, wherein the second energy management device is further operative to access the access data in the security device to validate the assertion.

5. The energy management system of claim 1, wherein the first energy management device is further operative to access the access data in the security device to validate the assertion and provide the validation to the second energy management device with the request.

6. The energy management system of claim 1, wherein the security device is further operative to intercept the request, validate the request and provide the validation to the second energy management device.

7. The energy management system of claim 1, wherein the security device is affiliated with a third entity different from the first and second entities.

8. The energy management system of claim 1, wherein the security device is affiliated with the first entity.

9. The energy management system of claim 1, wherein the assertion comprises an assertion of identity of the first energy management device.

10. The energy management device of claim 1, wherein the first energy management device is operated by a plurality of users, the access data further identifying which of the plurality of users are permitted to access the energy management data, the request comprising identity of a particular user of the plurality of users which generated the request and the assertion further comprising an assertion of authorization to access the energy management data by the particular user.

11. The energy management system of claim 1, wherein the energy management data comprises first and second portions, the access data further identifying entities and affiliates thereof, unaffiliated with the second entity, which are permitted to access the first portion, the second portion or a combination thereof.

12. The energy management system of claim 1, wherein the energy management data comprises billing data.

13. The energy management system of claim 1, wherein the energy management data comprises energy data.

14. The energy management system of claim 1, wherein the access data provided by the security device is implemented using Kerberos.

15. The energy management system of claim 1, wherein the access data provided by the security device is implemented using Microsoft Passport.

16. The energy management system of claim 1, wherein the access data provided by the security device is implemented using Security Assertion Markup Language.

17. The energy management system of claim 1, wherein an affiliate of an entity comprises a human user of the first energy management device.

18. The energy management system of claim 1, wherein at least one of the first and second energy management devices comprises an intelligent electronic device.

19. The energy management system of claim 1, wherein the energy management data comprises authenticatable data.

20. The energy management system of claim 1, wherein the energy management data comprises encrypted data.

21. The energy management system of claim 1, wherein the energy management data comprises non-repudiatable data.

22. The energy management system of claim 1, wherein the energy management data comprises private data.

23. The energy management system of claim 1, wherein the energy management system is operative to process energy management data in a secure manner between the first and second energy management devices.

24. The energy management system of claim 1, wherein the first and second energy management devices communicate over the network using an XML web service.

25. A method of managing an energy distribution system, the system comprising first and second energy management devices and a network coupled with the first and second energy management devices and operative to facilitate communications therebetween, the first energy management device being affiliated with a first entity and the second energy management device being affiliated with a second entity different from the first entity, wherein at least the second energy management device includes an energy distribution system interface operative to couple the second energy management device with at least a portion of the energy distribution system and a processor coupled with the energy distribution system interface and operative to generate energy management data therefrom, the method comprising:

providing access data identifying entities and affiliates thereof, unaffiliated with the second entity, which are permitted to access the energy management data;

requesting by the first energy management device at least a portion of the energy management data from the second energy management device via the network, the request including an assertion of authorization to access the energy management data; and validating, by the processor, the assertion via the provided access data and limiting access to the energy management data based thereon.

26. The method of claim 25, wherein the providing further comprises providing the access data from a source external to the second energy management device.

27. The method of claim 26, wherein the providing further comprises providing the access data via the network.

28. The method of claim 25, wherein the validating further comprises accessing, by the second energy management device, the access data to validate the assertion.

29. The method of claim 25, further comprising accessing, by the first energy management device, the access data to validate the assertion and providing the validation to the second energy management device with the request.

30. The method of claim 25, further comprising intercepting the request, validating the request and providing the validation to the second energy management device.

31. The method of claim 25, wherein the access data is provided by a third entity different from the first and second entities.

32. The method of claim 25, wherein the access data is provided by the first entity.

33. The method of claim 25, wherein the assertion comprises an assertion of identity of the first energy management device.

34. The method of claim 25, wherein the first energy management device is operated by a plurality of users, the access data further identifying which of the plurality of users are permitted to access the energy management data, the request comprising identity of a particular user of the plurality of users which generated the request and the assertion further comprising an assertion of authorization to access the energy management data by the particular user.

35. The method of claim 25, wherein the energy management data comprises first and second portions, the access data further identifying entities and affiliates thereof, unaffiliated with the second entity, which are permitted to access the first portion, the second portion or a combination thereof.

36. The method of claim 25, wherein the energy management data comprises billing data.

37. The method of claim 25, wherein the energy management data comprises energy data.

38. The method of claim 25, wherein the access data provided by the security device is implemented using Kerberos.

39. The method of claim 25, wherein the access data provided by the security device is implemented using Microsoft Passport.

40. The method of claim 25, wherein the access data provided by the security device is implemented using Security Assertion Markup Language.

41. The method of claim 25, wherein an affiliate of an entity comprises a human user of the first energy management device.

42. The method of claim 25, wherein at least one of the first and second energy management devices comprises an intelligent electronic device.

43. The method of claim 25, wherein the energy management data comprises authenticatable data.

44. The method of claim 25, wherein the energy management data comprises encrypted data.

45. The method of claim 25, wherein the energy management data comprises non-repudiatable data.

46. The method of claim 25, wherein the energy management data comprises private data.

47. The method of claim 25, wherein the energy management system is operative to process energy management data in a secure maimer between the first and second energy management devices.

48. The method of claim 25, wherein the first and second energy management devices communicate over the network using an XML web service.

49. An energy management system for managing an energy distribution system, the energy management system comprising:

first and second energy management devices, the first energy management device being affiliated with a first entity and the second energy management device being affiliated with a second entity different from the first entity;

wherein at least the second energy management device includes:

means for interfacing the second energy management device with at least a portion of the energy distribution system;

means for generating energy management data therefrom; and means for providing access data identifying entities and affiliates thereof, unaffiliated with the second entity, which are permitted to access the energy management data;

the energy management system further comprising:

network means coupled with the first and second energy management devices for facilitating communications therebetween; and wherein the first energy management device is operative to request at least a portion of the energy management data from the second energy management device via the network, the request including an assertion of authorization to access the energy management data, the second energy management device further comprising means for validating the assertion via the access data provided and limiting access to the energy management data based thereon.

* * * * *

UNITED STATES PATENT AND TRADEMARK OFFICE
CERTIFICATE OF CORRECTION

| | |
|---|---|
| PATENT NO. | : 7,127,328 B2 |
| APPLICATION NO. | : 10/998396 |
| DATED | : October 24, 2006 |
| INVENTOR(S) | : Douglas S. Ransom |

It is certified that error appears in the above-identified patent and that said Letters Patent is hereby corrected as shown below:

On the Title Page

In column 2, Line 18, under "ABSTRACT", delete "NABs" and substitute --NAEs-- in its place.

Page 2, column l, line 32, under "U.S. PATENT DOCUMENTS", after "6,694,270", delete "B1" and substitute --B2-- in its place.

Page 2, column 1, line 34, under "U.S. PATENT DOCUMENTS", after "6,836,737", delete "B1" and substitute --B2-- in its place.

Page 2, column 1, line 37, under "U.S. PATENT DOCUMENTS", after "2001/0039537 A1", delete "11/2001" and substitute --8/2001-- in its place.

Page 2, column 2, line 21, after "Vykon $^{TM}$ Energy" delete "Energy".

Page 2, column 2, line 25, after "from an", delete "energyView" and substitute --EnergyView-- in its place.

Page 2, column 2, line 33, after "Dial-up Energy", delete "meter" and substitute --Meter-- in its place.

Page 2, column 2, line 35, after "Specifications p.1", delete "or" and substitute --of-- in its place.

Page 2, column 2, line 39, delete "IModem$^{TM}$" and substitute --iModem-- in its place.

Page 2, column 2, line 64, after "Toronto, Canada pp.", delete "1-19® 1998 Poer" and substitute --1-19, ® 1998 Power-- in its place.

Page 2, column 2, line 70, after "com/html/" delete "prtsep" and substitute --prlsep-- in its place.

Page 3, column 1, line 23, after "Metering2000", delete "Munchens5" and substitute --Munchen5-- in its place.

Page 3, column 1, line 33, after "source,", delete "metering" and substitute --Metering-- in its place.

UNITED STATES PATENT AND TRADEMARK OFFICE
CERTIFICATE OF CORRECTION

| | |
|---|---|
| PATENT NO. | : 7,127,328 B2 |
| APPLICATION NO. | : 10/998396 |
| DATED | : October 24, 2006 |
| INVENTOR(S) | : Douglas S. Ransom |

It is certified that error appears in the above-identified patent and that said Letters Patent is hereby corrected as shown below:

On the Title Page (cont'd)

Page 3, column 1, line 64, after "as early as", delete "mar." and substitute --Mar.-- in its place.

Page 3, column 1, line 67, before "News & Events", delete "MuNet" and substitute --muNet-- in its place.

Page 3, column 2, line 1, before "News & Events", delete "MuNet" and substitute --muNet-- in its place.

Page 3, column 2, line 10, before "Published in Energy", delete "pof 1" and substitute --of 1-- in its place.

Page 3, column 2, line 28, after "John Wiley &", delete "S ons" and substitute --Sons-- in its place.

Page 3, column 2, line 33, after "/users/", delete "mikemikemike" and substitute --mikemike-- in its place.

Page 3, column 2, line 52, after "/solutions/", delete "overviw" and substitute --overview-- in its place.

Page 3, column 2, line 71, after "archive.org/web/", delete "20020221165904" and substitute --20020221165907-- in its place.

UNITED STATES PATENT AND TRADEMARK OFFICE
CERTIFICATE OF CORRECTION

PATENT NO. : 7,127,328 B2
APPLICATION NO. : 10/998396
DATED : October 24, 2006
INVENTOR(S) : Douglas S. Ransom It is certified that error appears in the above-identified patent and that said Letters Patent is hereby corrected as shown below:

In the Claims

Column 23, line 45, delete "I claim:" and substitute --We claim-- in its place.

Column 26, in claim 47, line 57, after "in a secure", delete "maimer" and substitute --manner-- in its place.

Signed and Sealed this

Tenth Day of April, 2007

JON W. DUDAS
*Director of the United States Patent and Trademark Office*